UNITED STATES PATENT OFFICE.

WILLIAM ADAMSON, OF PHILADELPHIA, PENNSYLVANIA.

IMPROVEMENT IN OBTAINING FIBER FROM COTTON-SEED.

Specification forming part of Letters Patent No. 195,969, dated October 9, 1877; application filed September 13, 1877.

*To all whom it may concern:*

Be it known that I, WILLIAM ADAMSON, of Philadelphia, Pennsylvania, have invented a new and useful Improvement in Obtaining Fiber from Cotton-Seed, of which the following is a specification:

The object of my invention is to obtain from cotton-seed for paper-stock the lint and part of the husk or hull to which the lint adheres.

By the ginning of cotton the seeds cannot be entirely detached from the fiber, a portion of which will continue, after the most thorough ginning, to adhere tenaciously to the husk in the condition of fine lint, which is available for paper-stock and for other purposes.

In order to obtain this stock I proceed as follows: I first crush the seed by passing it between rollers, or pounding it in mortars, or by any other convenient process. This first operation fractures the husk and kernel, exposes the latter, and reduces the seeds to the best condition for the second branch of the process, which consists in submitting the crushed seeds in a mass to the influence of hydrocarbon solvents. This may be accomplished by subjecting the seeds to the vapors of benzine or other volatile hydrocarbons, as described in the Letters Patent No. 117,852, granted to me on the 8th day of August, 1871, or the crushed seeds may be subjected to liquid hydrocarbons, or to both liquid hydrocarbons and the vapors of the same. I prefer to carry out this process with the hydrocarbons under heat and pressure, for I have ascertained that the greater the heat and pressure the better is the effect produced.

By this treatment the resinous, gummy matter which causes the lint to adhere to the husk is dissolved, or so far dissolved as to loosen the hold of the lint on the husk, or the greater portion of the husk. At the same time the oily matter of the seeds is extracted, and both kernel and husk rendered so friable that they will easily yield to the third operation. This consists in subjecting the mass to the action of a disintegrator—the well-known machine of Carr, for instance—by which the particles of kernel and husk are broken up.

The disintegrated mass is now sifted by any suitable system of sieves or otherwise, so that the particles of kernel and husk shall be seperated from the lint.

Small pieces of a pellicle which forms a part of the husk, and which, being of a fibrous texture, is available as paper-stock, adhere to the lint.

The fibrous product of the above processes may be at once subjected to the usual operations preparatory to converting it into paper, and can be used either alone or in connection with other paper-stock, or the product may be bleached, if the stock has to be converted into a white paper.

In some parts of the cotton-growing regions it is a common practice to decorticate the cotton-seeds, so as to extract the kernel, which, as farinaceous matter, is available as food for cattle, rejecting or using as fuel the hulls, husks, and adhering fiber. These hulls, with adhering lint, may be treated in the manner described above for paper-stock.

I claim as my invention—

1. The process herein described of subjecting the hulls or husks of cotton-seed and the adhering lint to hydrocarbon solvents, for the purpose specified.

2. The mode herein described of obtaining paper-stock from cotton-seed—that is to say, first, crushing the seeds; second, subjecting the crushed seeds to the action of hydrocarbon solvents; third, disintegrating the seeds; and, fourth, sifting the mass, all substantially as set forth.

In testimony whereof, I have signed my name to this specification in the presence of two subscribing witnesses.

WILLIAM ADAMSON.

Witnesses:
HERMANN MOESSNER,
HARRY SMITH.